United States Patent Office 2,705,111
Patented Mar. 29, 1955

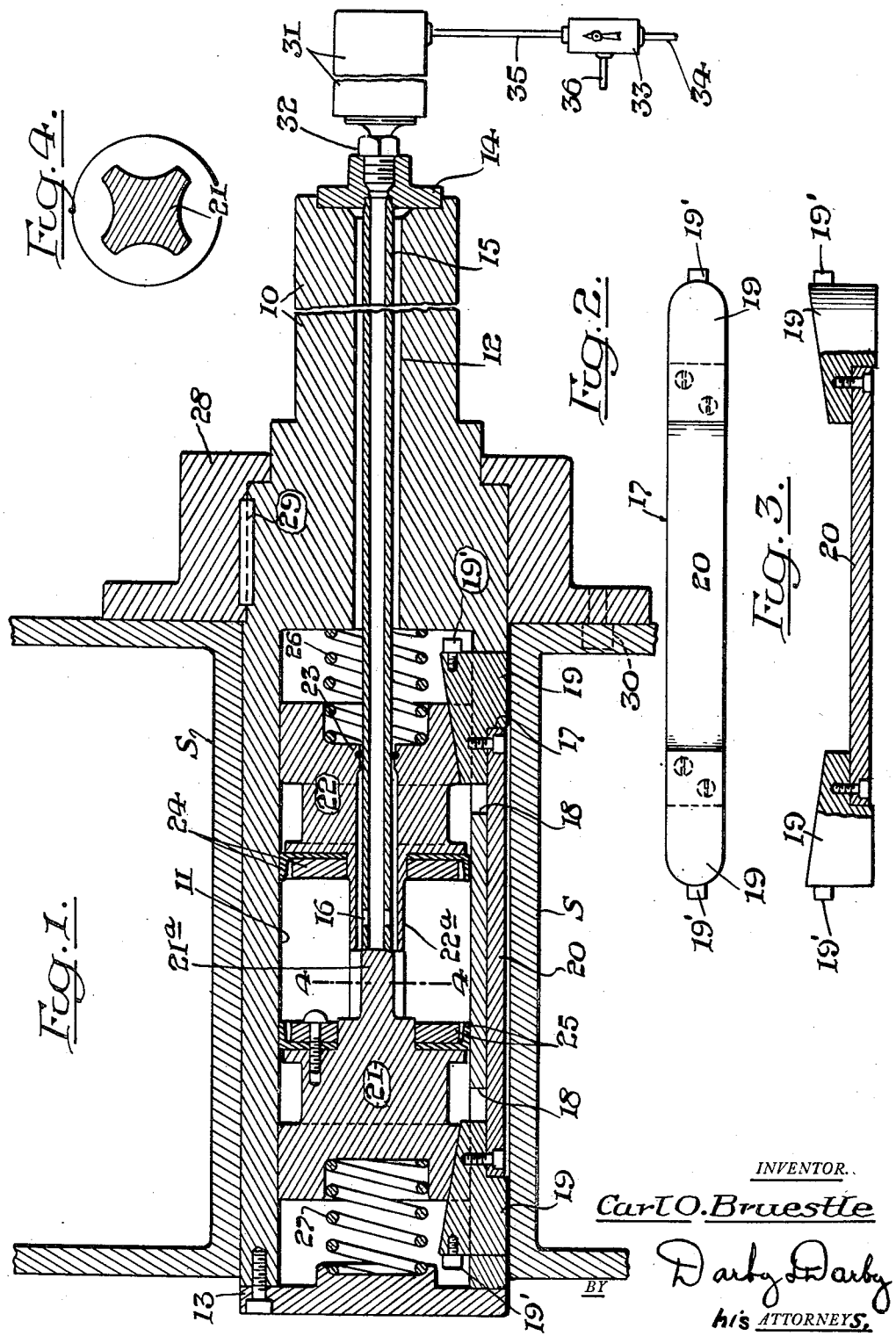

2,705,111

EXPANSIBLE ARBOR

Carl O. Bruestle, Metuchen, N. J., assignor to Syncro Machine Company, Perth Amboy, N. J., a corporation of New Jersey

Application August 19, 1953, Serial No. 375,205

2 Claims. (Cl. 242—46.2)

This invention is for an expansible arbor for spooling and reeling devices characterized by a structural arrangement which facilitates very rapid locking of a spool on the arbor and the release thereof for removal.

In the art of spooling, as for example in the spooling of wire, the spooling machines include a power driven arbor upon which the spool is mounted to rotate it at high speed during coiling of the wire thereon. Because of the speeds employed and the forces involved in the operation of devices of this type, it is always necessary to provide mechanism for locking the spool on the arbor to insure against their escape while the machine is in operation.

As a result of these requirements various forms of expensive and complicated devices have been developed which require a number of manual operations and a vigilance on the part of the operator which require an inordinate amount of time in mounting and dismounting the spool and a care on the part of the operator which must not be relaxed if safety requirements are to be met.

Particularly because the down time of these machines is disproportionate to the operating time by reason of the manual operation required, it is proposed in accordance with this invention to provide an expanding arbor which requires but a single manipulation to lock the spool thereon or to release it for removal.

The general object of this invention is to provide a spool locking expanding mandrel of a pneumatic operating type which requires the single manipulation of a valve to lock the spool on the arbor and to release it for removal.

The invention, of course, involves subsidiary details of construction directed to the attainment of the main object. The single embodiment of the invention illustrated in the attached drawings is an example of one structural form capable of obtaining these objects.

In the drawings,

Figure 1 is a longitudinal, central, cross-sectional view with an intermediate portion broken away of an arbor in accordance with this invention;

Figure 2 is a plan view of one of the wedge locking members for the spool;

Figure 3 is a side elevational view thereof with the central portion broken away; and Figure 4 is a cross-sectional view taken on the line 4—4 of Figure 1.

The main arbor or spindle 10 is of circular cross-sectional form having several sections of different radii. The largest of these sections has a cylindrical cavity 11 opening at one end of the arbor and forming a pressure fluid cylinder. This cylinder is connected at its inner end with a central tubular passage 12 which extends to the other end of the arbor. The open end of the cylinder 11 is closed by means of a cap 13 secured in place in any suitable manner, as for example by means of cap screws as shown. Seated in the opposite end of the arbor and secured thereto in any suitable manner is a disc-shaped fixture 14 having a passage therethrough and internal threads at the outer end thereof. Secured in the other end of the passage of the fixture 14 is a tube 15 which extends into the cylinder 11 and terminates approximately at the longitudinal center thereof. This tube is provided with a series of radial apertures 16 as shown.

The wall of the cylinder 11 is provided with longitudinal grooves opening at the periphery thereof. A plurality of these grooves are provided, as for example in one suitable practical form three such grooves are arranged to be positioned 120 degrees apart around the cylinder wall. As is clear in Figure 1, these grooves extend but approximately half way through the thickness of the cylinder wall. However, the bottom wall of each groove is cut out at each end, as shown at 18, so as to extend entirely through the cylinder wall. The combined overall shape of the apertures in combination with the grooves 17 is shown in Figure 2.

The composite resultant cutout consists of a parallel sided figure having rounded ends. Mounted in the passages 18 are a pair of wedges 19, the outer faces of which are substantially flush with the outer surface of the cylinder wall and the inner surfaces of which project into the cylinder 11 and are tapered towards the center of the cylinder, as clearly shown in Figure 1. Each pair of wedges 19 is connected by a bar 20 and machine screws, as shown. It will be noted that the outer faces of the bars 20 are recessed slightly below the outer faces of the wedges 19 which outer faces lie in the peripheral surface of the cylinder wall when retracted radially, as shown in Figure 1, which can be termed the relaxed position of the wedges.

Within the cylinder 11 are a pair of pistons 21 and 22 which are provided with piston cap assemblies 25 and 24 respectively. Piston 21 is provided with a fluted projection 21ᵃ extending towards piston 22 and having a cross-sectional shape, as shown in Figure 4. Similarly the piston 22 has a tubular projection 22ᵃ extending towards the piston 21 and forms a continuation of the passage through that piston in which the tube 15 lies. An O-seal ring 23 provides a fluidtight sliding contact between the piston 22 and the tube 15.

A spring 26 is seated at the base of the cylinder 11 and at the other end engages a recess in the piston 22. Similarly a compression spring 27 seats at one end in the cap 13 and engages a recess at its other end in the piston 21. These springs are of normal strength so that when cylinder 11 is open to exhaust the two pistons will be moved towards the center of the cylinder and will come to rest when their extensions 21ᵃ and 22ᵃ contact, as shown in Figure 1.

Each of the pistons is provided with an inclined surface groove at the point of intersection with the adjacent wedge 19. As previously suggested, there will be three sets of these wedges 19 displaced 120 degrees apart around the cylinder wall and the pistons will have corresponding inclined grooves to provide a mating coaction as indicated for the pair shown in Figure 1.

A threaded coupling 32 is attached to the fixture plate 14 and forms part of a fluid pressure tight rotary seal 31, a device which is valuable commercially. The housing for this seal is fixed but the coupling 32 can rotate with the arbor as the latter will do in its normal functioning. A pressure fluid supply pipe 34 from a suitable source connects to the inlet of a valve 33 which is provided with an exhaust pipe 36 and a connection 35 to the rotary sealing device 31. The flange member 28 which is connected by the key 29 to the arbor 10 is a part of the bearing structure which supports the arbor. Mounted thereon is a pin 30 positioned to engage an aperture in the head of the spool S to be locked on the arbor.

In the operation of this device the valve 33 is set so that the supply of pressure fluid for the rotary sealing device 31 is cut off and the latter device is open to atmosphere through the exhaust 36. Under these conditions the parts are in the position shown in Figure 1. The locking device is then relaxed and the spool S can be slipped onto the cylinder forming portion of the arbor, as indicated in the drawings. To lock the spool in place the operator merely throws the handle of valve 33 to its other position to connect pipe 34 with pipe 35 and thereby supply pressure fluid through the rotary sealing device 31 to the interior of tube 15. This pressure fluid will then discharge through the radial port 16 and through the grooves in the fluted extension 21ᵃ into that portion of cylinder 11 comprising the space defined by the pistons 21 and 22. The pistons will move in opposite directions, causing the wedge assemblies 19—20 to move outwardly under a radial direction so that the outer faces of the wedges 19 will grip the inner core of the spool S. Since the coupling 32 can revolve with the arbor 10 it is apparent that when the machine is put in operation to rotate the spool the latter will remain locked on the arbor so long as the pressure fluid supply is continued to the cylinder 11.

After the spool is full and the machine is brought to a stop the handle of valve 33 is moved back to the position shown to connect cylinder 11 with the atmosphere through the rotary seal 31, pipe 35 and exhaust 36. When this happens the springs 26 and 27 will return the pistons to central position relaxing the wedges. The spool is now free and can be slipped off the arbor. Incidentally the cap screws 19' on the ends of the wedges are merely provided to prevent the wedge assemblies from dropping out of their seats in the wall of the cylinder 11.

From the above description it will be apparent that a spool can be locked on the spindle and released from it by the very simple operation of moving the handle of valve 33 from an off position to an on position and back again. It follows, therefore, that the down time of the machine for spool change is at a minimum.

Those skilled in this art will be able to conceive of various modifications of this structure without departing from the novel subject matter herein disclosed, and I will not, therefore, accept limitation except as required by the claims.

What is claimed is:

1. A spool arbor of the type described comprising a rotatable shaft having a pressure fluid cylinder therein, spool engaging wedges mounted on the cylinder-forming wall of said shaft, piston means in said cylinder for causing radial outward movement of said wedges, means for supplying pressure fluid to and exhausting it from said cylinder to activate said piston means, said piston means comprising a pair of pistons and springs normally urging said pistons into contact at approximately the longitudinal center of said cylinder, said fluid pressure supply and exhaust means being connected to the space in the cylinder between said pistons.

2. A spool arbor of the type described comprising a rotatable shaft having a pressure fluid cylinder therein, spool engaging wedges mounted on the cylinder-forming wall of said shaft, piston means in said cylinder for causing radial outward movement of said wedges, means for supplying pressure fluid to and exhausting it from said cylinder to activate said piston means, said piston means including springs for actuating said piston to release said wedges when the cylinder is being exhausted.

References Cited in the file of this patent

UNITED STATES PATENTS

| | | |
|---|---|---|
| 559,682 | Coultas, Jr. | May 5, 1896 |
| 2,215,069 | Meisel | Sept. 17, 1940 |
| 2,241,669 | McConnell | May 13, 1941 |
| 2,266,408 | Bruestle | Dec. 16, 1941 |